United States Patent Office 2,932,566
Patented Apr. 12, 1960

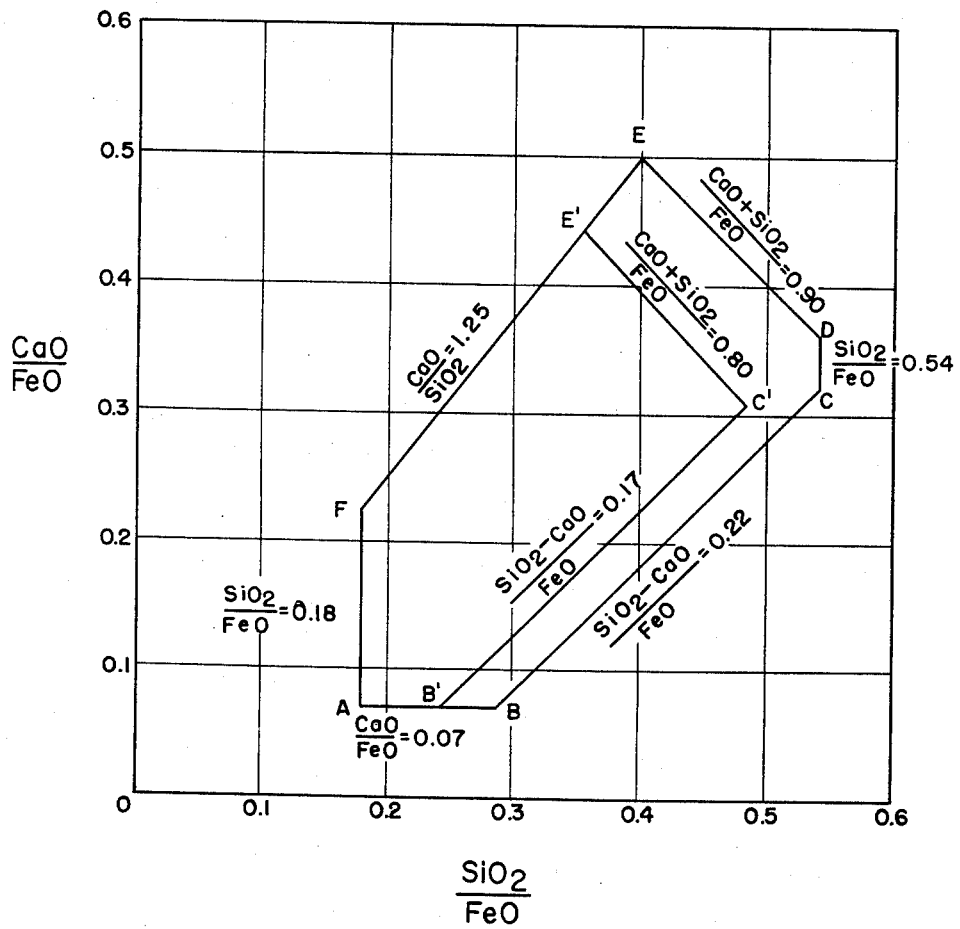

2,932,566

BLAST FURNACE SMELTING OF ZINCIFEROUS MATERIALS

John Lumsden, Bristol, England, assignor, by mesne assignments, to Metallurgical Development Company, Nassau, Bahamas Application September 24, 1957, Serial No. 685,862

Claims priority, application Great Britain March 1, 1957

9 Claims. (Cl. 75—87)

This invention relates to the blast furnace smelting of zinciferous materials, and has for its object the provision of certain improvements in the smelting of oxidic zinciferous materials with coke in a blast furnace.

In the smelting of oxidized zinc ores in a blast furnace with coke, it is customary to sinter the ore together with any slag-forming additions thereto, and to charge the sinter and coke to the furnace. During smelting, air is introduced into the furnace, molten slag is run off from the bottom of the furnace, and zinc compounds are reduced to yield zinc vapor, which is recovered from its admixture with the furnace gases as metallic zinc, zinc oxide, zinc dust or the like. When the zinciferous material contains a recoverable amount of lead, the zinc-smelting blast furnace can be adapted to smelt the mixed zinc-lead material to yield, in addition to the zinc volatilized, molten metallic lead, which is tapped from the bottom of the furnace along with the molten slag.

The oxidic zinciferous material charged to the blast furnace may arise from a number of sources. The main primary source of zinc is the mineral sphalerite (zinc sulphide—ZnS), which occurs in admixture with other minerals, from which it is more or less completely separated by froth flotation or other suitable means of concentration. The zinc concentrate thus separated usually contains iron (in the form of one of its sulphides) as the main other component. Sphalerite often occurs in admixture with galena (lead sulphide—PbS), and a mixture of these two sulphides can be separated from the other minerals with which they are originally mixed. Such sulphur-containing materials must be converted to the oxides, usually by roasting, before being charged to the blast furnace. One method of effecting this conversion is to sinter-roast under such conditions as to oxidize the zinc sulphide to zinc oxide (with formation of sulphur dioxide) and simultaneously obtain a product in suitable physical condition for charging to a blast furnace.

One object of the present invention is to improve the efficiency of zinc recovery by controlling the composition of the slag tapped from the furnace. One essential characteristic of a metallurgical slag is that it shall be fluid at the temperature prevailing at the bottom of the furnace. In the smelting of the more easily reducible metals, such as lead, the composition of the slag is so chosen as to have as low a melting point as possible. With more difficultly reducible metals, such as tin, fairly large amounts of lime (CaO) are included in the slag to reduce the residual tin content of the slag. Zinc is a difficultly reducible metal, and in blast furnace zinc-smelting it has heretofore been customary to include (by addition to the furnace charge) fairly large amounts of lime in the slag to facilitate the liberation of zinc (as vapor) and to reduce the residual zinc content of the slag. One slag composition that has heretofore been found suitable in smelting either zinciferous materials (containing little or no lead) or zinc-lead materials is characterized by the respective ratios of iron oxide (FeO), lime and silica ($SiO_2$) in the molten slag of about 1.0:1.5:1.5; a typical slag analyzing about 21% FeO, 32% CaO, 32% $SiO_2$ and 15% of other metal oxides such as zinc (ZnO), aluminum ($Al_2O_3$), manganese (MnO), magnesium (MgO) etc. In all ferruginous slags arising in non-ferrous metallurgy, there is some ferric oxide, and throughout this specification, as is customary in the art, the content of iron oxides in the slag is calculated as FeO.

In the smelting of an oxidic zinciferous material, or oxidic zinc-lead material, in a blast furnace, with volatilization of zinc, and the recovery of zinc in a lead-splash condenser, the efficiency of the recovery of zinc (and lead when present) is limited by two factors. Firstly, some zinc (and lead when present) is contained in the slag. Secondly, some of the volatilized zinc is converted to dross in the condenser and some escapes from the condenser and is subsequently collected as a sludge or dust. The dross, sludge and dust also contain some lead, derived either from lead volatilized during smelting or from the lead used as a condensing medium in the lead-splash condenser.

The present invention aims to improve the efficiency of zinc recovery (as well as lead when present) in the blast furnace smelting of zinciferous materials, as well as zinc-lead materials, and is based on my discovery that by controlling the relative amounts of iron oxide, lime and silica included in a furnace charge of zinciferous material of relatively high iron content a substantial reduction in the amount of slag-forming materials included in the charge can be effected with a corresponding substantial reduction in the weight of slag formed, while the zinc content of the slag is satisfactorily low. The slag itself comes within a range of compositions that have not hitherto been used in the blast furnace smelting of either zinc or lead. I have further discovered that when the zinciferous material contains lead, slags within this range of compositions improve zinc vapor condensation and are hence advantageous even where the zinc-lead material is not rich in iron and hence greater amounts of slag-forming materials must be included in the furnace charge.

Thus, the invention involves controlling within certain limits the composition of the slag run off from the furnace, such control being effected by adjustment of the slag-forming oxides included in the furnace charge. While such slags contain a large number of components, with the type of materials normally used in zinc blast furnace smelting the properties of the slags are determined essentially by the relative contents of their main components (i.e. iron oxide, lime and silica), and while some regard must be paid to the alumina content, variations in the relatively small amounts of the other oxides (MnO, MgO etc.) present are usually of only minor importance.

The slag produced according to the invention is characterized by a relatively high content of iron oxide; typically between 45 and 62% FeO, with 10 to 16% CaO, 15 to 22% $SiO_2$, 1 to 15% (and more usually 3 to 7%) $Al_2O_3$; and the balance other oxides usually of minor importance. However, for practical purposes, the range of slag compositions is better defined in terms of the relative amounts of the main components, as hereinafter set out, but, to explain the physico-chemical mechanism which underlies the operation of the invention, it can be stated that a characteristic of this range of slag compositions is that the primary solid phase that is formed when the molten slag is cooled contains iron oxide and no silica. This primary phase may be either wüstite (non-stoichiometric FeO) or hercynite (ferrous aluminate—$FeAl_2O_4$).

A further characteristic of the slag is its comparatively high melting point. In zinc blast furnace smelting, it is desirable to eliminate the zinc as completely as possible from the slag without reducing the iron oxide to give a high-melting metallic iron and without unduly increasing the ratio of coke used to zinc produced. I have found that this object is best attained if the slag has a high melting point; more specifically, the criterion is that the temperature, at which most, but not all, of the slag becomes molten, should be high. The temperature of complete melting is, in general, determined by the formation, on cooling the molten slag below that temperature, of a solid phase of composition different from that of the liquid slag. If the composition of the solid phase formed is not too dissimilar to that of the liquid slag, further cooling through a moderate temperature range causes the formation of a considerable amount of solid. In so far as the slag produced is relatively low in alumina content (i.e. does not exceed about 8–10%), the primary solid phase that separates is wüstite, which is the predominant component of the liquid slag so that the temperature of complete melting is a suitable criterion. In slags of somewhat higher alumina content, however, the primary phase separating may be hercynite ($FeAl_2O_4$), which contains alumina as its main component, whereas alumina is still only a minor component of the slag. Cooling below the temperature at which hercynite first begins to separte then produces only a small further amount of this phase, until a point is reached at which wüstite starts to solidify, and then further cooling rapidly produces a substantial amount of wüstite. For the purpose of this invention, the temperature at which wüstite starts to separate is essentially the criterion for determining the highest temperature at which the slag is effectively brought into contact with the reducing gases in the furnace hearth; the higher this temperature, the more completely can the zinc be eliminated from the slag.

My interpretation of the behavior of the slags in a zinc-smelting blast furnace is that, with other conditions maintained constant, the amount of zinc left in the slag is largely determined by the melting point of the slag. Further, the presence of zinc oxide in the slag lowers the melting point compared with that of the corresponding zinc-free slag. In this sense, the effective melting point is that at which wüstite starts to separate, as hereinbefore explained. The slag composition can be controlled directly only with respect to the components other than zinc oxide, and this primarily determines the composition of the corresponding zinc-free slag. The lower the melting point of the zinc-free slag, the more zinc oxide is contained in the actual slag produced, and therefore the lower is the melting point of the actual slag compared with that of the zinc-free slag. As a consequence, when the melting point of the zinc-free slag is high (say 1280° C.), the actual slag contains but little zinc and its melting point is not much below 1280° C. As the melting point of the zinc-free slag decreases, the more is the melting point of the actual slag reduced by the inclusion therein of zinc oxide, so that finally a point is reached at which the solution of further zinc oxide in the slag lowers the melting point to such an extent as to increase the capacity of the slag to hold this extra zinc oxide in solution in contact with the reducing gases. Therefore, when the melting point of the zinc-free slag is reduced below a critical point, the zinc content of the slag produced rises rapidly to a high value. This critical point is about 1200° C. One characteristic of this invention is that the main slag-forming components (FeO, CaO, $SiO_2$) included in the blast furnace charge are such that they produce a slag which in the absence of zinc (i.e. the corresponding zinc-free slag) has a melting point of at least 1200° C. but not exceeding 1320° C., and preferably within the range of 1240 to 1280° C.

When only a small amount of lead is present in the materials charged to a zinc blast furnace, it is all volatilized. When larger amounts of lead are present, some is collected as molten metallic lead from the furnace bottom along with the slag. At the high temperature prevailing in the lower zones of the furnace, lead metal reacts with sulphur compounds, such as iron sulphide, to yield lead-sulphide vapor. If the furnace charge contains but little iron, some of this lead-sulphide vapor escapes with the furnace gases and reacts with zinc vapor to form zinc sulphide with consequent less of zinc and attendant condensation difficulties. The iron-oxide-rich slag of the invention has a relatively high solubility for iron sulphide and hence there is less tendency for the formation of lead sulphide at slag temperatures around 1300° C. Such lead sulphide vapor as is formed passes upwardly through the furnace and is cooled from the high molten slag temperature to around 1150° C., and the lead sulphide reacts with iron oxide and carbon monoxide to form metallic lead vapor, carbon dioxide and iron sulphide, which latter is readily dissolved in the iron-oxide-rich slag.

As previously mentioned, it is often convenient to incorporate all of the slag-forming materials in the charge prior to sintering. When the zinciferous material is a lead-zinc sulphide concentrate, and this is sinter-roasted with the large amount of limstone needed to form the high-lime type of slag heretofore customary in the art, it is difficult to eliminate the sulphur completely, since the residual sulphur is largely fixed as calcium sulphate. I have discovered that, when a zinc-lead concentrate is sinter-roasted with the relatively small quantity of limestone needed to form the slag composition contemplated by the present invention, the sulphur can be almost completely eliminated. In this case, the invention provides, in addition to the previously mentioned advantage that such sulphur as is introduced into the furnace is largely prevented from escaping into the furnace gases as lead sulphide, the further advantage that less sulphur is introduced into the furnace than in any prior art process.

The range of slag compositions of the type contemplated by the invention in which iron oxide is the predominant component can conveniently be represented graphically as in the accompanying drawing, in which the polygonal area of the single figure graphically represents the area within which lie the weight ratios of (1) lime and (2) slica to ferrous oxide in slag compositions produced in accordance with the principles of the invention.

The six boundary lines AB, BC, CD, DE, EF and FA of the polygonal area shown in the figure represent the limits of the oxide weight ratios indicated thereon by the respective legends in slags whose alumina content does not exceed about 5%. These six boundary lines correspond to the following six inequalities where the signs > and < are to be read as "equal to" as well as "greater than" and "less than," respectively:

AB: $CaO/FeO > 0.07$
BC: $(SiO_2 - CaO)/FeO < 0.22$
CD: $SiO_2/FeO < 0.54$
DE: $(CaO + SiO_2)/FeO < 0.90$
EF: $CaO/SiO_2 < 1.25$
FA: $SiO_2/FeO > 0.18$

Alternatively stated, the silica included in the furnace charge is, by weight, between 0.18 and 0.54 times the amount of iron oxide present, with the amount of lime at least equal to 0.07 times the amount of iron oxide present but not greater than 1.25 times the amount of silica, the ratio of silica to iron oxide not exceeding the ratio of lime to iron oxide by more than 0.22, and the sum of the amounts of lime and silica not being greater than 0.9 times the amount of iron oxide. The slag compositions are attained by controlling the total amounts of the three main components (iron oxide, lime and silica) in the furnace charge including the coke ash, so that their weight ratios come within the foregoing limits, or alternatively lie within the polygonal area defined by the oxide weight ratio boundary lines of the figure.

The CaO/FeO limiting ratio (greater than 0.07) is determined by the fact that it has been found that at ratios higher than 0.07, the additional lime exerts a pronounced beneficial effect in both raising the melting point of the slag and increasing its sulphur holding capacity.

The limiting ratio of $(SiO_2-CaO)/FeO$ (less than 0.22) is imposed because starting from any point along this boundary line, replacement of CaO by $SiO_2$ causes a rapid fall in the melting point of the slag.

The $SiO_2/FeO$ ratio (less than 0.54) defines the limit that must be reached by additions of iron oxide and lime where the zinciferous material is relatively rich in silica; while the lower $SiO_2/FeO$ ratio (greater than 0.18) is determined by the fact that it has been found that a certain amount of silica is needed during the sintering of the non-carbonaceous charge materials to impart sufficient strength to the sinter.

The $(CaO+SiO_2)/FeO$ ratio (less than 0.90) defines the limit that must be reached by iron oxide additions where the zinciferous material contains too much lime and silica in comparison with iron oxide.

The $CaO/SiO_2$ ratio (less than 1.25) defines approximately the boundary line of the wüstite phase.

Within the specified range of compositions, simultaneously increasing the $CaO/FeO$ and $SiO_2/FeO$ ratios to the same extent causes a relatively slow fall in the melting point of the slag and a decrease of sulphur-holding capacity.

Best results are obtained with slag compositions rich in iron oxide, and with the lime less, but not much less, than the silica; for instance, a desirable slag composition is obtained with $CaO/FeO$ equal to about 0.19 and $SiO_2/FeO$ is obtained with $CaO/FeO$ equal to about 0.19 and $SiO_2/FeO$ equal to about 0.24.

In general, a compromise must be achieved between the desirable slag composition and the avoidance of unduly increasing the slag weight. In particular, if the material to be treated contains much silica, a low value of $SiO_2/FeO$ can be attained only by adding a very large quantity of iron oxide.

When iron oxide derived from pyrites is included in the furnace charge to adjust the iron oxide content of the slag composition, it is, of course, particularly advantageous if the pyrites contain some lead and zinc. One aspect of the invention is that it enables use to be made of iron-rich sulphide ores containing relatively small amounts of zinc and lead.

The slags produced will normally contain around 3-7% alumina. In the slag compositions contemplated by the invention, no special consideration need be given an alumina content up to about 5% (that is, when the alumina content of the materials charged to the furnace is not greater than 0.05 times the total content of the slag-forming oxides), since the aforementioned boundary lines of the Figure and the aforementioned oxide weight ratios have taken into account the presence of such low alumina content. In slags of low alumina content, wüstite is the first phase to separate, and increase of alumina content decreases the temperature of complete melting of the slag. By what is believed to be a consequence of this melting-point effect, a part of the range of slag compositions contemplated by the invention becomes less suitable when the alumina content lies between 5% and 10% (that is, when the alumina content of the materials charged to the furnace lies between 0.05 and 0.10 times the total content of slag-forming oxides). To insure good zinc elimination from such relatively high alumina slags, the following restricting oxide weight ratio conditions should be imposed:

B'C': $(SiO_2-CaO)/FeO<0.22-0.01(X-5)$ and
C'E': $(SiO_2+CaO)/FeO<0.90-2(X-5)$ where $X$=percent $Al_2O_3$ in the slag; these conditions applying only when X is between 5 and 10%. If, now, the symbol "X" is used to signify the ratio of the alumina content of the materials charged to the furnace to the total weight of slag-forming oxides, the last two inequalities become B'C': $(SiO_2-CaO)/FeO<0.22-(X'-0.05)$ and
C'E': $(SiO_2+CaO)/FeO<0.90-2.0(X'-0.05)$;

these conditions applying only when X' is between 0.05 and 0.10. Graphically expressed, the polygonal area of the figure within the boundary lines AB', B'C', C'E', E'F and FA represents the area of favorable slag compositions when the alumina content of the slag is around 10%. In slag compositions where the alumina content varies from 5 to 10%, the area of favorable slag compositions moves inwardly from the boundary lines AB and DE toward the boundary lines B'C' and C'E', respectively, in proportion to the increase in alumina content of the slag from 5 to 10%.

The following examples illustrate various practical applications of the invention:

*Example 1*

100 parts of a sulphide concentrate containing 52.0% zinc, 10% iron, 3.0% silica, 0.5% lime, 0.5% alumina, 1.0% lead, 32.0% sulphur and 1.0% of other non-volatile materials such as oxides of manganese and magnesia, are sinter-roasted, and the sinter charged to the blast furnace with 3.0 parts of lime and 55 parts of coke. The coke contains 10% ash, the ash containing 3.6% lime, 20.0% iron oxide calculated as FeO, 25.5% alumina, and 40.0% silica. The slag-forming constituents will thus be as follows:

|  | From Concentrates | From lime | From Coke Ash | Total |
|---|---|---|---|---|
| FeO | 12.9 |  | 1.1 | 14.0 |
| $SiO_2$ | 3.0 |  | 2.2 | 5.2 |
| CaO | 0.5 | 3.0 | 0.2 | 3.7 |
| $Al_2O_3$ | 0.5 |  | 1.4 | 1.9 |
| Others | 1.0 |  | 0.6 | 1.6 |
|  | 17.9 | 3.0 | 5.5 | 26.4 |

$SiO_2/FeO=0.37$.
$CaO/FeO=0.26$.

The slag produced will contain 4.0% zinc oxide (3.2% zinc) and its total weight will be 27.5 parts (per 100 parts of concentrates) containing 0.9 part of zinc (this representing 1.7% of the original 52 parts of zinc in the concentrates). The slag will contain 51% FeO, 19% $SiO_2$, 13.5% CaO and 7% $Al_2O_3$.

*Example 2*

100 parts of a sulphide concentrate containing 40.0% zinc, 7.0% iron, 4.0% silica, 1.0% lime, 0.5% alumina, 17.0% lead and 29.0% sulphur are sinter-roasted with 15 parts pyrites containing 46% iron and 6 parts limestone containing 52% CaO. The sinter is charged to the blast furnace with 45 parts of coke containing 10% ash of the same composition as in Example 1. The slag-forming constituents are as follows:

|  | From Concentrates | From Pyrites | From Lime | From Coke Ash | Total |
|---|---|---|---|---|---|
| FeO | 9.0 | 8.9 |  | 0.9 | 18.8 |
| $SiO_2$ | 4.0 |  |  | 1.8 | 5.8 |
| CaO | 1.0 |  | 3.1 | 0.2 | 4.3 |
| $Al_2O_3$ | 0.5 |  |  | 1.1 | 1.6 |
| Others | 1.5 |  | 0.2 | 0.5 | 2.2 |
|  | 16.0 | 8.9 | 3.3 | 4.5 | 32.7 |

$SiO_2/FeO=0.31$.
$CaO/FeO=0.23$.

The slag produced will contain 3.2% zinc oxide (2.4% zinc) and its total weight will be 33.8 parts per 100 parts of concentrates. It will contain 56% FeO, 17% $SiO_2$, 12.7% CaO and 5% $Al_2O_3$.

Example 3

100 parts of a sulphide concentrate containing 28% zinc, 31% lead, 23% sulphur, 8% silica, 2% lime, 1% alumina and 4% iron are sinter-roasted with sufficient pyrites to give 12 parts iron, and the sinter is charged to the blast furnace with limestone (containing 5 parts CaO) and 33 parts coke containing 10% ash of the same composition as in Example 1. The slag-forming constituents are as follows:

|  | From Concentrates | From Lime | From Pyrites | From Coke Ash | Total |
|---|---|---|---|---|---|
| FeO | 5.1 |  | 15.4 | 0.7 | 21.2 |
| SiO$_2$ | 8.0 |  |  | 1.3 | 9.3 |
| CaO | 2.0 | 5.0 |  | 0.1 | 7.1 |
| Al$_2$O$_3$ | 1.0 |  |  | 0.8 | 1.8 |
| Others | 4.0 |  |  | 0.4 | 4.4 |
|  | 20.1 | 5.0 | 15.4 | 3.3 | 43.8 |

SiO$_2$/FeO=0.44.
CaO/FeO=0.33.

The slag produced will contain 5.0% zinc oxide (4.0% zinc) and its total weight will be 46.1 parts per 100 parts of concentrates. It will contain 46% FeO, 20% SiO$_2$, 15.4% CaO and 4% Al$_2$O$_3$.

Example 4

With the lead-zinc concentrate containing (as in Example 3) 28% zinc, 31% lead, 23% sulphur, 8% silica, 2% lime, 1% alumina and 4% iron, there is also available a pyrite containing lead and zinc sulphides, its analysis being 36% iron, 8% zinc, 4% lead and 2% silica. 100 parts of the lead-zinc concentrates are sinter-roasted with 80 parts of the pyrites, and the sinter is charged to the blast furnace with six parts of lime and 40 parts of coke containing 10% ash of the same composition as in Example 1. The slag-forming constituents are as follows:

|  | From Concentrates | From Pyrites | From Lime | From Coke Ash | Total |
|---|---|---|---|---|---|
| FeO | 5.1 | 37.1 |  | 0.8 | 43.0 |
| SiO$_2$ | 8.0 | 1.6 |  | 1.6 | 11.2 |
| CaO | 2.0 |  | 6.0 | 0.1 | 8.1 |
| Al$_2$O$_3$ | 1.0 |  |  | 1.0 | 2.0 |
| Others | 4.0 |  |  | 0.5 | 4.5 |
|  | 20.1 | 38.7 | 6.0 | 4.0 | 68.8 |

SiO$_2$/FeO=0.26.
CaO/FeO=0.19.

The slag will contain 2.5% zinc oxide (2.0% zinc) and its total weight will be 70.6 parts, and it will contain 61% FeO, 16% SiO$_2$, 11.5% CaO and 3% Al$_2$O$_3$.

To the concentrate of Example 1, according to the prior art practice, there would be added large amounts of lime and silica. For example, to the sinter-roasted product from 100 parts of concentrates, there would be added 20 parts of lime and 16 parts of silica, so that there would be produced about 60 parts of a slag containing 14 parts FeO, 21 parts CaO, and 21 parts SiO$_2$. The slag weight is thus more than twice that produced in Example 1.

With the concentrate of Example 2, according to the prior art practice, 100 parts of the concentrates would be sinter-roasted with 26 parts of limestone containing 52% CaO and 90 parts of silica. From 100 parts of concentrates there would then be obtained 43.8 parts of slag containing 9.9 parts FeO, 14.7 parts CaO, and 14.8 parts silica. The slag weight according to the invention is less than according to the prior art, and in addition, with such a lead-containing charge a better condensation efficiency is attained than in the process of the prior art.

The concentrate of Example 3 could be smelted, according to the prior art practice, with the addition of slightly more lime than used in Example 3 and without the addition of any pyrites. The slag weight produced by the prior art practice could be smaller than in Example 3, but, with a charge containing so much lead, the condensation efficiency is poorer in the process of the prior art than in Example 3.

Example 4 illustrates how the process of the invention enables use to be made of a ferruginous material containing zinc and lead in amounts too small to make it economically feasible to smelt it by itself.

It will be evident from the foregoing description and examples that when, as is usual, iron is the main slag-forming component in the zinciferous material, the invention enables a suitable slag to be produced with only a small addition of slag-forming materials such as lime and therefore to produce a lower amount of slag than in the prior art practice. With zinciferous materials deficient in iron for the purposes of the invention, the iron added is conveniently derived from pyrites, which may contain recoverable amounts of zinc or lead or both. When mixed lead-zinc materials are being treated, the invention has the further advantage that the amount of lead sulphide volatilized is less, and therefore the condensation efficiency is higher, than in the prior art practice.

When the alumina content of the slag rises above about 10%, with hercynite the primary solid phase separating upon cooling and wüstite the secondary solid phase separating, the temperature of wüstite separation (which, as previously explained, is the criterion for determining the highest temperature at which the slag is brought into effective contact with reducing gases) is not greatly affected by the increase of alumina content above 10%. Consequently, as far as zinc elimination from the slag is concerned, the composition range defined by the polygon AB'C'E'FA is suitable for alumina contents from 10% up to 15%. As the alumina content increases, however, the temperature at which hercynite separates becomes higher, and this is liable to lead to difficulty in the smooth tapping of slag from the furnace. This separation of hercynite at unduly high temperatures becomes particularly pronounced in the low-lime high-iron regions of polygon AB'C'E'FA. For a combination of good zinc elimination with smooth tapping of slag, it is desirable that the alumina content of the slag should not greatly exceed 10%. Should, however, higher contents of alumina be encountered, an unduly high temperature of complete melting can be avoided by imposing, for slags containing from 10 to 15% alumina (that is, when the alumina content of the materials charged to the furnace lies between 0.10 and 0.15 times the total content of slag-forming oxides), the further restriction (in addition to those defined by the inequalities graphically represented by the polygon AB'C'E'FA) that $$CaO/FeO > 0.07 + 0.05(Y-10)$$

where Y=percent Al$_2$O$_3$ in the slag. Slags containing more than 15% alumina would not be used. If, now, the symbol "Y'" is used to signify the ratio of the alumina content of the materials charged to the furnace to the total weight of slag-forming oxides, this last inequality (valid for values of Y' from 0.10 to 0.15) becomes $$CaO/FeO > 0.07 + 5(Y'-0.10)$$

I claim:
1. In the process of smelting an oxidic zinciferous material with coke in a blast furnace and running off a molten slag made up for the most part of iron oxide, lime and silica, and recovering zinc from the furnace gases, the improvement which comprises charging to the furnace materials containing, by weight, a total amount of silica between 0.18 and 0.54 times the total amount of iron oxide (calculated as FeO), and a total amount of lime at least equal to 0.07 times the amount of iron oxide present but no greater than 1.25 times the amount of silica present, the ratio of silica to iron oxide not exceeding the ratio of lime to iron oxide by more than 0.22, and the combined amounts of lime and silica not being greater than 0.9 times the amount of iron oxide.

2. Process according to claim 1, in which the proportions of iron oxide, lime and silica are adjusted to produce a molten slag defined by the following six inequalities:

(1) $CaO/FeO > 0.07$
(2) $(SiO_2 - CaO)/FeO < 0.22$
(3) $SiO_2/FeO < 0.54$
(4) $(CaO + SiO_2)/FeO < 0.90$
(5) $CaO/SiO_2 < 1.25$
(6) $SiO_2/FeO > 0.18$

3. Process according to claim 1, in which the alumina content of the materials charged to the furnace is not greater than 0.05 times the total content of slag-forming oxides.

4. Process according to claim 1, in which the alumina content of the materials charged to the furnace lies between 0.05 and 0.10 times the total content of slag-forming oxides, and the weight ratios of iron oxide, lime and silica in the charge materials are further restricted by the following inequalities:

(1) $(SiO_2 - CaO)/FeO < 0.22 - (X' - 0.05)$
(2) $(SiO_2 + CaO)/FeO < 0.90 - 2(X' - 0.05)$ where $X'$ is the ratio of the alumina content to the total content of slag-forming oxides.

5. Process according to claim 1, in which the alumina content of the materials charged to the furnace lies between 0.10 and 0.15 times the total content of the slag-forming oxides, and the weight ratios of iron oxide, lime and silica in the charge materials are further restricted by the following inequalities:

(1) $(SiO_2 - CaO)/FeO < 0.17$
(2) $(SiO_2 + CaO)/FeO < 0.80$ and $CaO/FeO > 0.07 + 5(Y' - 0.10)$, where $Y'$ is the ratio of alumina content to the total content of slag-forming oxides.

6. Process according to claim 1, in which part of the iron oxide included in the materials charged to the furnace is derived from specially added pyrites.

7. Process according to claim 1, in which part of the iron oxide included in the materials charged to the furnace is derived from specially added pyrites containing zinc.

8. Process according to claim 1, in which the zinciferous material contains lead, and molten metallic lead is formed in and is run off from the furnace along with the molten slag.

9. Process according to claim 1, in which part of the iron oxide included in the materials charged to the furnace is derived from specially added pyrites containing zinc and lead.

References Cited in the file of this patent

UNITED STATES PATENTS

| | | |
|---|---|---|
| 2,598,743 | Waring et al. | June 3, 1952 |
| 2,693,410 | Waring et al. | Nov. 2, 1954 |

UNITED STATES PATENT OFFICE

CERTIFICATE OF CORRECTION

Patent No. 2,932,566                                    April 12, 1960

John Lumsden

It is hereby certified that error appears in the printed specification of the above numbered patent requiring correction and that the said Letters Patent should read as corrected below.

Column 1, line 65, for "line" read -- lime --; column 4, line 5, for "less" read -- loss --; line 21, for "limstone" read -- limestone --; line 41, for "slica" read -- silica --; column 5, lines 31 and 32, strike out "is obtained with CaO/FeO equal to about 0.19 and $SiO_2$/FeO"; line 70, for "—2(X—5)" read -- —0.02(X—5) --; line 74, for "symbol "X" is" read -- symbol "X'" is --.

Signed and sealed this 27th day of September 1960.

(SEAL)
Attest:

KARL H. AXLINE                                              ROBERT C. WATSON
Attesting Officer                                          Commissioner of Patents